United States Patent
Jürs et al.

(10) Patent No.: US 9,532,582 B2
(45) Date of Patent: Jan. 3, 2017

(54) DEVICE AND METHOD FOR MACHINE PROCESSING OF BEHEADED AND AT LEAST SUBSTANTIALLY GUTTED FISH, TRANSPORTED TAIL-FIRST IN TRANSPORT DIRECTION T ON A TRANSPORT PATH

(71) Applicant: Nordischer Maschinenbau Rud. Baader GmbH + Co. KG, Lübeck (DE)

(72) Inventors: Michael Jürs, Neustadt (DE); Matthias Schroeder, Badendorf (DE); Manfred Brandt, Lübeck (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 14/784,576

(22) PCT Filed: Apr. 8, 2014

(86) PCT No.: PCT/EP2014/056990
§ 371 (c)(1),
(2) Date: Oct. 14, 2015

(87) PCT Pub. No.: WO2014/170163
PCT Pub. Date: Oct. 23, 2014

(65) Prior Publication Data
US 2016/0073647 A1    Mar. 17, 2016

(30) Foreign Application Priority Data
Apr. 19, 2013   (DE) .......................... 10 2013 103 995

(51) Int. Cl.
 *A22C 25/00*    (2006.01)
 *A22C 25/16*    (2006.01)
 *A22C 25/12*    (2006.01)

(52) U.S. Cl.
 CPC ............... *A22C 25/16* (2013.01); *A22C 25/12* (2013.01)

(58) Field of Classification Search
 CPC ......... A22C 25/00; A22C 25/08; A22C 25/16; A22C 25/166; A22C 25/23
(Continued)

(56) References Cited

U.S. PATENT DOCUMENTS 4,084,294 A    4/1978  Dohrendorf
4,825,510 A *  5/1989  Braeger ................. A22C 25/16
                                               452/162

(Continued)

FOREIGN PATENT DOCUMENTS

| CN | 1440237 A | 9/2003 |
| CN | 102480978 S | 5/2012 |
| CN | 102905538 A | 1/2013 |

OTHER PUBLICATIONS

International Search Report dated Jun. 18, 2015 from International Patent Application No. PCT/IB2014/056990, filed Apr. 8, 2014.

*Primary Examiner* — Richard Price, Jr.
(74) *Attorney, Agent, or Firm* — Sunstone IP (57) ABSTRACT

The invention relates to an apparatus, designed and adapted for machine processing of decapitated and at least substantially gutted fish, transported tail-first in transport direction T on a transport path, comprising a conveying means which conveys the fish along the transport path and a cutting device for removing the flesh from the flank bones of the bone structure of a fish after cutting free the ventral and dorsal spokes, wherein the cutting device comprises a pair of circular knives which can be driven so as to rotate about a point of rotation D and which are arranged on opposite sides of the transport path and are designed to be adjustable relative to the position of the fish and thus to the bone structure, which is characterized in that each circular knife is allocated a means that is designed and configured to hold down at least some of the flank bones during the removal process of the flesh from the bone structure. Furthermore, the invention relates to a corresponding method.

14 Claims, 9 Drawing Sheets

(58) Field of Classification Search
USPC ................ 452/135, 161, 162, 163, 165, 170
See application file for complete search history.

(56) References Cited

U.S. PATENT DOCUMENTS

| | | | | |
|---|---|---|---|---|
| 5,088,958 | A * | 2/1992 | Evers | A22C 25/16 |
| | | | | 452/152 |
| 5,520,576 | A | 5/1996 | Wastell et al. | |
| 5,871,395 | A * | 2/1999 | Grabau | A22C 25/166 |
| | | | | 452/161 |
| 6,280,313 | B1 * | 8/2001 | Braeger | A22C 25/16 |
| | | | | 452/161 |
| 6,322,437 | B1 * | 11/2001 | Grabau | A22C 25/16 |
| | | | | 452/135 |
| 7,090,574 | B2 | 8/2006 | Braeger et al. | |
| 8,814,637 | B2 | 8/2014 | Jurs et al. | |
| 2004/0253915 | A1 | 12/2004 | Braeger et al. | |
| 2010/0255767 | A1 * | 10/2010 | Jurs | A22C 25/16 |
| | | | | 452/135 |
| 2012/0149290 | A1 * | 6/2012 | Jurs | A22C 25/16 |
| | | | | 452/162 |
| 2013/0059514 | A1 | 3/2013 | Jurs et al. | |
| 2015/0087214 | A1 * | 3/2015 | Jurs | A22C 25/16 |
| | | | | 452/162 |
| 2016/0073647 | A1 * | 3/2016 | Jurs | A22C 25/12 |
| | | | | 452/135 |

* cited by examiner

DEVICE AND METHOD FOR MACHINE PROCESSING OF BEHEADED AND AT LEAST SUBSTANTIALLY GUTTED FISH, TRANSPORTED TAIL-FIRST IN TRANSPORT DIRECTION T ON A TRANSPORT PATH

CROSS REFERENCE TO RELATED APPLICATIONS

This application is a U.S. National Stage Application of PCT Application No. PCT/EP2014/056990, filed Apr. 8, 2014, which claims the benefit of German Patent Application No. 10 2013 103 995.2, filed on Apr. 19, 2013. The contents of each of the aforementioned patent applications are incorporated herein by reference in their entirety.

BACKGROUND

Technical Field

The invention relates to an apparatus, designed and adapted for machine processing of decapitated and at least substantially gutted fish, transported tail-first in transport direction T on a transport path, comprising a conveying means which conveys the fish along the transport path and a cutting device for removing the flesh from the flank bones of the bone structure of a fish after cutting free the ventral and dorsal spokes, wherein the cutting device comprises a pair of circular knives which can be driven so as to rotate about a point of rotation D and which are arranged on opposite sides of the transport path and are designed to be adjustable relative to the position of the fish and thus to the bone structure.

State of the Art

The invention further relates to a method for machine processing of decapitated and at least substantially gutted fish in which the ventral spokes and dorsal spokes are already cut free, comprising the steps: Transporting the fish tail-first in transport direction T along a transport path by a conveying means, and removing the flesh from the flank bones of the bone structure of the fish by a cutting device, by inserting into the fish, on either side of the fish between the flank bones and the flesh to be removed, one rotating circular knife of the cutting device in each case above the flank bones up to the backbone of the bone structure.

SUMMARY

Such apparatuses and methods are used in the fish processing industry to process fish which are already decapitated and substantially gutted and in which the ventral spokes and the dorsal spokes are already cut free. In other words, the apparatus and the method are used to remove or cut free the flesh, or more precisely the fillets, from the flank bones of the bone structure. To do this the circular knives which can be driven so as to rotate are positioned at an appropriate angle to the natural structure of the flank bones. By transporting the fish along the transport path on which the circular knives lie, the circular knives enter the fish from both sides, that is between the flank bones and the fillet to be removed above the flank bones such that the fillets are removed up to the backbone.

The flank bones are referred to as such bones or spokes which enclose the abdominal area or abdominal cavity or which extend in the shape of an arch around the abdominal cavity. Flank bones are arranged along the backbone of the bone structure. Flank bones are predominantly firmly attached to the backbone on either side of it. With flank bones of this type, a so-called stump bone, which is firmly attached to the backbone, initially extends transversally to said backbone, the stump bone merging into a so-called rib bone. Expressed simply, a stump bone and a rib bone form a flank bone firmly arranged on the backbone. Such flank bones, which extend from the region of the backbone directed towards the tail to the region of the backbone directed towards the head, have a slight curvature which corresponds to the curvature of the abdominal cavity or encloses said cavity. The region directed towards the tail is also referred to as the tail region for the sake of simplicity. The region directed towards the head is correspondingly referred to as the head region. Arranged in the head region of the fish or the backbone are further flank bones which are only connected to the backbone by a type of articulated joint. These flank bones, which are found particularly in white fish species, such as cod, display a higher curvature compared to the flank bones firmly attached to the backbone such that, due to the upright shape, they are also known as "spider bones". These highly curved or arched flank bones have a tendency to be pushed over the cutting edge of the circular knives during the removal process. During removal of the flesh from the bone structure, or more precisely during removal of the fillets from the flank bones, by the circular knives, there is a danger that the cutting edge of the circular knife will cut up the bone arch projecting beyond the cutting edge, that is lying in the operating or cutting region, particularly in the downstream (head) region of the backbone, into individual fragments. As a result, fragments or remnants of the bones will remain in the fillet, making subsequent work on the fillet necessary. To avoid the danger of cutting up the flank bones, the incision of the circular knives may be set higher which results in reducing the risk of cutting up the flank bones. However, such a cut leads to a significant reduction in the yield as more flesh of the fillet including the complete flank bones remains on the bone structure or on the backbone.

Such an apparatus with the corresponding method is known in principle, for example, from DE 10 2007 053 905. This document, originating from the applicant's company, discloses an apparatus with all the features of the preamble of claim 1.

Thus the object of the invention is to create a simple apparatus by which the fillets can be removed gently and yield-efficiently from the bone structure. The object is also to propose a corresponding method.

This object is achieved according to the invention by an apparatus having the features referred to hereinbefore in that each circular knife is assigned a means which is designed and adapted to hold down at least some of the flank bones during the process of removing the flesh from the bone structure. As a result of the additional means assigned to each circular knife, flank bones projecting into the operating or cutting region of the circular knife, namely in particular the so-called "spider bones", or parts thereof can be effectively protected in relation to the rotating cutting edge of the circular knife. In other words, cutting off or cutting up the flank bones is effectively prevented during the removal process—with maximum flesh yield. The pieces of flesh or fillets obtained during the removal process are free from fragments of the flank bones in the tail-end region and in particular in the head-end region such that time-consuming subsequent work can be dispensed with.

An especially preferred embodiment of the invention is characterised in that the means is designed and adapted for actively holding down the flank bones arranged in the head region of the fish and comprises a deflecting element which is arranged on the upper side of the circular knife directed away from the flank bones and is designed and configured to be movable out of a waiting position, which uncovers the cutting edge of the circular knife, into a deflecting position, which at least partially covers the cutting edge of the circular knife and the cutting edge which runs in front counter to the transport direction T, and back again. Actively describes that the deflecting element for holding down or pressing down the flank bones is movable towards said flank bones. Passive holding down without any such dedicated deflection movements is to be understood in contrast to this. Due to the manoeuvrability of the deflecting element and in particular the position of the deflecting element in the deflecting position, it is ensured that on the one hand the sharp cutting edge of the circular knife is covered and thus the flank bones transported past the circular knife are protected, and on the other hand the flank bones entering the region of the cutting device in the head region of the fish are pressed downwards under the cutting edge before striking the circular knife or its cutting edge.

Advantageously, the deflecting element is designed to be disc-like and comprises a basic body and a deflecting body designed integrally with said basic body, wherein the deflecting body is formed from a finger-like ledge exposed in relation to the basic body which is aligned counter to the transport direction T. Due to the finger-like ledge which can also project nose-like or hook-like beyond the operating or cutting region of the cutting edge counter to the transport direction T, it is possible to ensure in a safe and easy manner that the flank bones will in any case be pressed downwards before striking or coming into the operating or cutting region of the circular knife. This ledge pointing counter to the transport direction T has the additional advantage that, in fish where in the head region there is no firm connection between the flesh to be removed and the flank bones since the flesh is separated from the flank bones by a sort of membrane, it can remove the flesh from the bone structure or, more precisely, from the flank bones without cutting but rather by scraping. As this type of removal is gentler on the product compared to cutting, an additional improvement in quality is achieved.

An expedient development of the invention is characterised in that the planes defined by the deflecting element and the circular knife lie parallel to each other and the deflecting element is movable relative to the circular knife. This ensures a fast, precise and simultaneously stable movement of the deflecting element between the positions referred to.

Expediently, the deflecting element is pivotable about a pivot point which lies outside the pivot of the circular knife. Therefore small or slight pivoting movements can achieve adequate adjustment of the deflecting element between the positions.

The deflecting element is advantageously assigned a pneumatic cylinder unit for executing the pivoting movements about the pivot point. The pneumatic cylinder unit offers a way of moving the deflecting element that is as simple as it is reliable.

Another particularly preferred embodiment of the invention is characterised in that the means is designed and adapted for holding down flank bones arranged in the head region of the fish and comprises a deflecting element which is arranged on the underside of the circular knife directed towards the flank bones, wherein the cutting edge of the circular knife has a larger circumference than the deflecting element such that the circular knife projects with the cutting edge beyond the deflecting element. This deflecting element alternatively and cumulatively preferred to the deflecting element provided on the upper side of the circular knife directed away from the flank bones assists with deflecting the flank bones under the cutting edge of the circular knife. This deflecting element therefore leads to the flank bones being held down passively as it virtually stands in the way of the upright flank bones or rather the flank bones projecting into the operating or cutting region of the circular knife and as a result forces them to deflect downwards under the cutting edge.

Advantageously, the deflecting element has a greater thickness than the circular knife. This means that the flank bones strike the deflecting element as early as possible and are accordingly deflected downwards.

An expedient development of the invention is characterised in that the deflecting element is an integral part of the circular knife, such that the deflecting element can be driven together with the circular knife so as to rotate about a point of rotation D. The integral design of circular knife and deflecting element ensures that the deflecting element stands permanently and precisely positioned in the correct position relative to the circular knife for holding down the flank bones. Alternatively to this, the deflecting element can also be designed to be stationary separately from the rotating circular knife such that the circular knife rotates above the deflecting element.

The deflecting element is preferably designed in the shape of a plate and is arranged concentrically to the circular knife, wherein a peripheral, ramp-shaped transition is configured between the circular knife and the deflecting element to form a deflection angle α. Starting from the circular knife or the plane defined by the circular knife, this ramp-shaped transition increases radially inwards towards the deflecting element or towards the plane of the deflecting element. The term "plane" in this context is not a two-dimensional plane in the strictly mathematical sense since the deflecting element has a material strength/thickness and therefore many planes which, however, all run parallel to each other and also parallel to the circular knife. Due to the gradient which increases radially inwards, the flank bones are reliably guided under the cutting edge of the circular knife.

The object is also achieved by a method having the steps referred to hereinbefore, in that at least some of the flank bones are pressed downwards by a means for holding down the flank bones during the process of removing the flesh from the bone structure. The special feature of the method according to the invention is that the flank bones situated on the backbone towards the head and, in particular, the so-called "spider bones" which, standing particularly upright, would intersect the operating or cutting region of the circular knife, are guided under the cutting edge before striking the cutting edge of the circular knife, as a result of which all the flank bones are protected against being damaged/cut up. The other advantages arising from this have already been described in connection with the apparatus, which is why reference will be made to the relevant passages to avoid repetitions.

Flank bones arranged in the head region of the fish are preferably actively guided downwards under the cutting edge of the circular knife by the means for holding down, as a deflecting element arranged on the upper side of the circular knife directed away from the flank bones is moved out of a waiting position which uncovers the cutting edge of the circular knife, into a deflecting position which at least partially covers the cutting edge of the circular knife and the cutting edge which runs in front counter to the transport direction T, and back again. The backwards movement back into the waiting position takes place in this case preferably only after the process of removing the fillet from the flank bones has finished completely, in order to prepare the apparatus, and in particular the cutting device, for the next removal process.

Advantageously, the deflecting element is pivoted in a timed manner about a pivot point which lies outside the point of rotation of the circular knife. Due to the timing, the deflecting element is only in the deflecting position when it is necessary. Due to said displacement of the pivot point, the circular knife or the cutting edge is kept sharp on the one hand and blunt on the other hand, depending on which state is actually required, by simple, short movements of the deflecting element.

A preferred development of the invention is characterised in that flank bones arranged in the head region of the fish are guided downwards under the cutting edge by the means for holding down, as these flank bones are guided downwards, due to the transport along the transport path, by a deflecting element arranged on the underside of the circular knife directed towards the flank bones.

The other advantages arising from the method steps according to the invention have already been described in connection with the apparatus, which is particularly well suited to carrying out the method according to the invention, which is why reference to the relevant passages will be also be made with regard to this.

BRIEF DESCRIPTION OF THE DRAWINGS

Further advantageous and/or expedient features and developments of the invention emerge from the dependent claims and the description. Especially preferred embodiments are explained in greater detail with reference to the attached drawing. The drawing shows:

DETAILED DESCRIPTION OF EMBODIMENTS

The invention will be described based on an apparatus for removing the fillets from the flank bones in white fish species. Naturally, however, the invention relates quite generally to apparatuses for removing flesh from the flank bones of a fish of different fish species. The apparatus according to the invention is illustrated as a stand-alone machine. The apparatus, however, is basically part of a filleting machine for filleting fish.

The apparatus 10 illustrated in the drawing is designed and adapted for machine processing of decapitated and at least substantially gutted fish, transported tail-first in transport direction T on a transport path. "Substantially" indicates that the guts are basically removed manually or mechanically, but there may be remnants of the guts and/or remnants of blood, which do not compromise the invention, located in the abdominal cavity. The apparatus 10 comprises a conveying means 11 conveying the fish along the transport path and a cutting device 12 for removing the flesh from the flank bones 13 and 13a of the bone structure 14 of a fish after cutting free the ventral and dorsal spokes 15, 16. The conveying means 11 comprises at least one rotatingly driven supporting body 17. Preferably a plurality of supporting bodies 17, which are also known as transport saddles, are rotatingly driven on a chain or similar. The fish lies belly-down and tail-first in transport direction T with its backbone 18 on the supporting body 17 such that the flank bones 13 extend laterally and slope or are slightly curved downwards. Equipment, such as in particular machine housing, control and/or drive units or similar for processing units, are arranged along the transport path on a frame or rack. One processing unit is the cutting device 12 which comprises a pair of circular knives 19, 20 which can be driven so as to rotate about a point of rotation D and which are arranged on opposite sides of the transport path and are designed to be adjustable relative to the position of the fish and thus to the bone structure 14 by the control and/or drive units. Processing units for cutting free the ventral spokes and the dorsal spokes are optionally arranged upstream of the cutting device 12.

This apparatus 10 is characterised according to the invention in that each circular knife 19, 20 is assigned a means 21, 22 which is designed and adapted to hold down at least some of the flank bones 13a during the process of removing the flesh from the bone structure 14. Flank bones 13, which are firmly connected to the backbone 18, pass through on the transport path underneath the circular knives 19, 20 or their operating or cutting region. The flank bones 13a on the side of the fish or the bone structure 14 directed away from the tail, that is on the head end of the bone structure 14, which are only connected to the backbone 18 via a sort of articulated joint, stand upright compared to the firmly connected flank bones 13 and are pressed under the circular knives 19, 20 by the means 21, 22 such that the circular knives 19, 20 can completely remove the fillets from the flank bones 13, 13a without damaging said flank bones 13, 13a.

When taken on their own or in combination with each other, the features and developments described below illustrate preferred embodiments. It is expressly pointed out that features which are summarised in the claims and/or the description or are described in a common embodiment can also further develop the apparatus 10 described above in a functionally independent manner.

Figure 1:
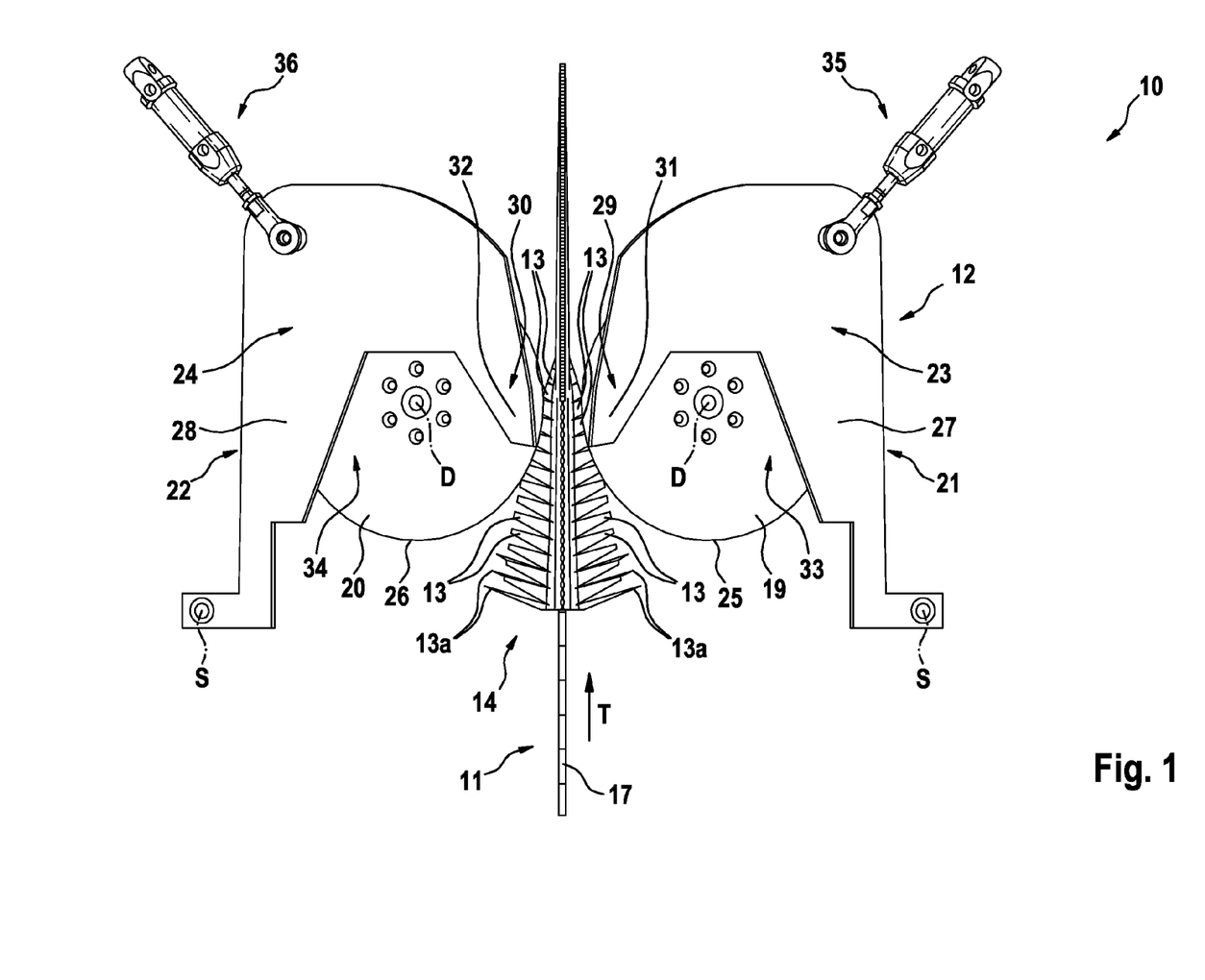
FIG. 1 a schematic representation of an apparatus according to the invention with the means for holding down at least some flank bones in the waiting position in a plan view, FIG. 2 the apparatus according to FIG. 1 in a perspective view, FIG. 3 the apparatus according to FIG. 1 in a lateral view, FIG. 4 the apparatus according to FIG. 1 in a view from the rear, FIG. 5 a schematic representation of an apparatus according to the invention with the means for holding down at least some flank bones in the deflecting position in a plan view, FIG. 6 the apparatus according to FIG. 5 in a perspective view, FIG. 7 the apparatus according to FIG. 5 in a lateral view, FIG. 8 the apparatus according to FIG. 5 in a view from the rear, and FIG. 9 a schematic representation of the bone structure of a fish to be processed with a deflecting element arranged exclusively underneath the circular knife in a view from the rear.
Figure 2:
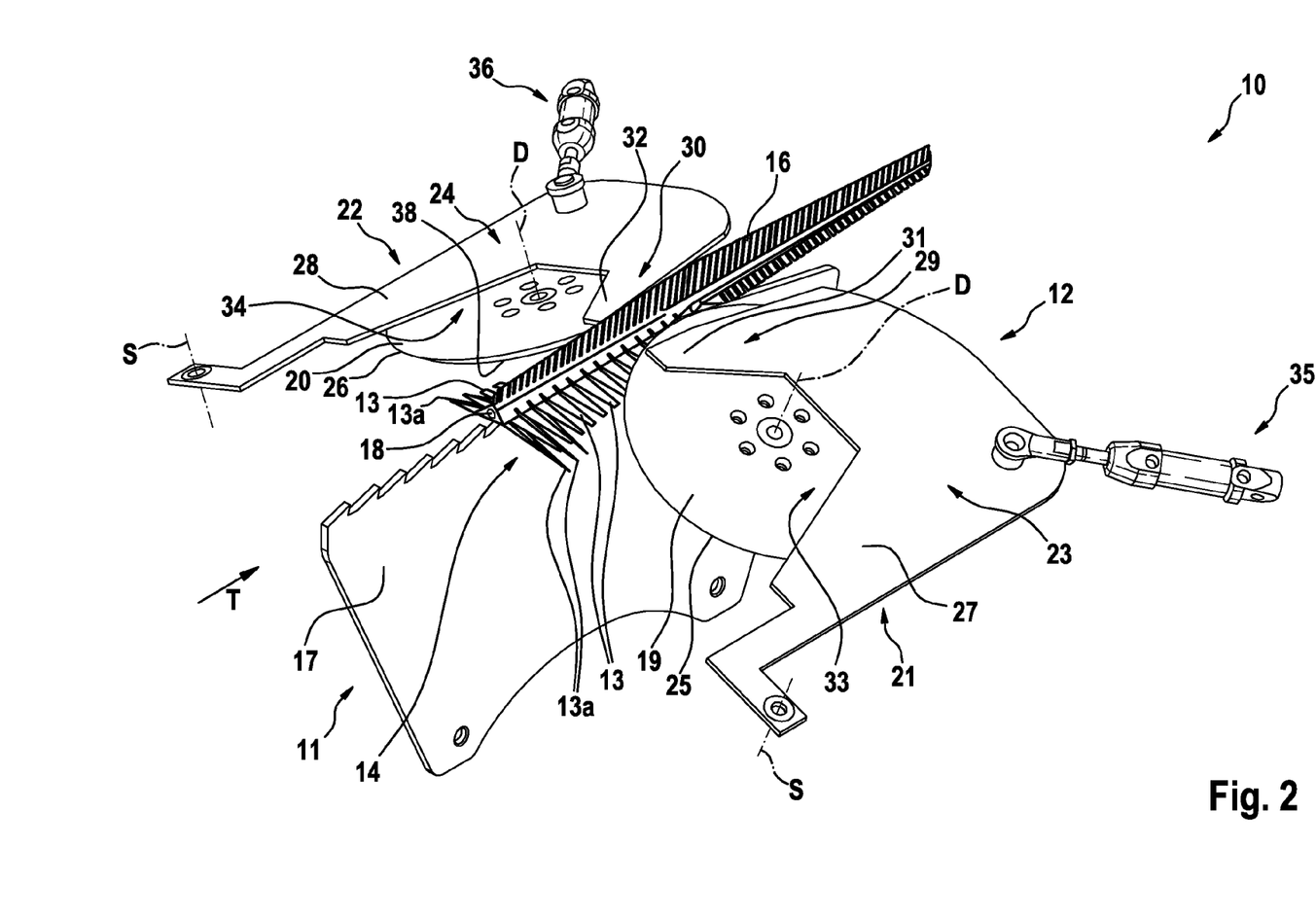
Figure 3:
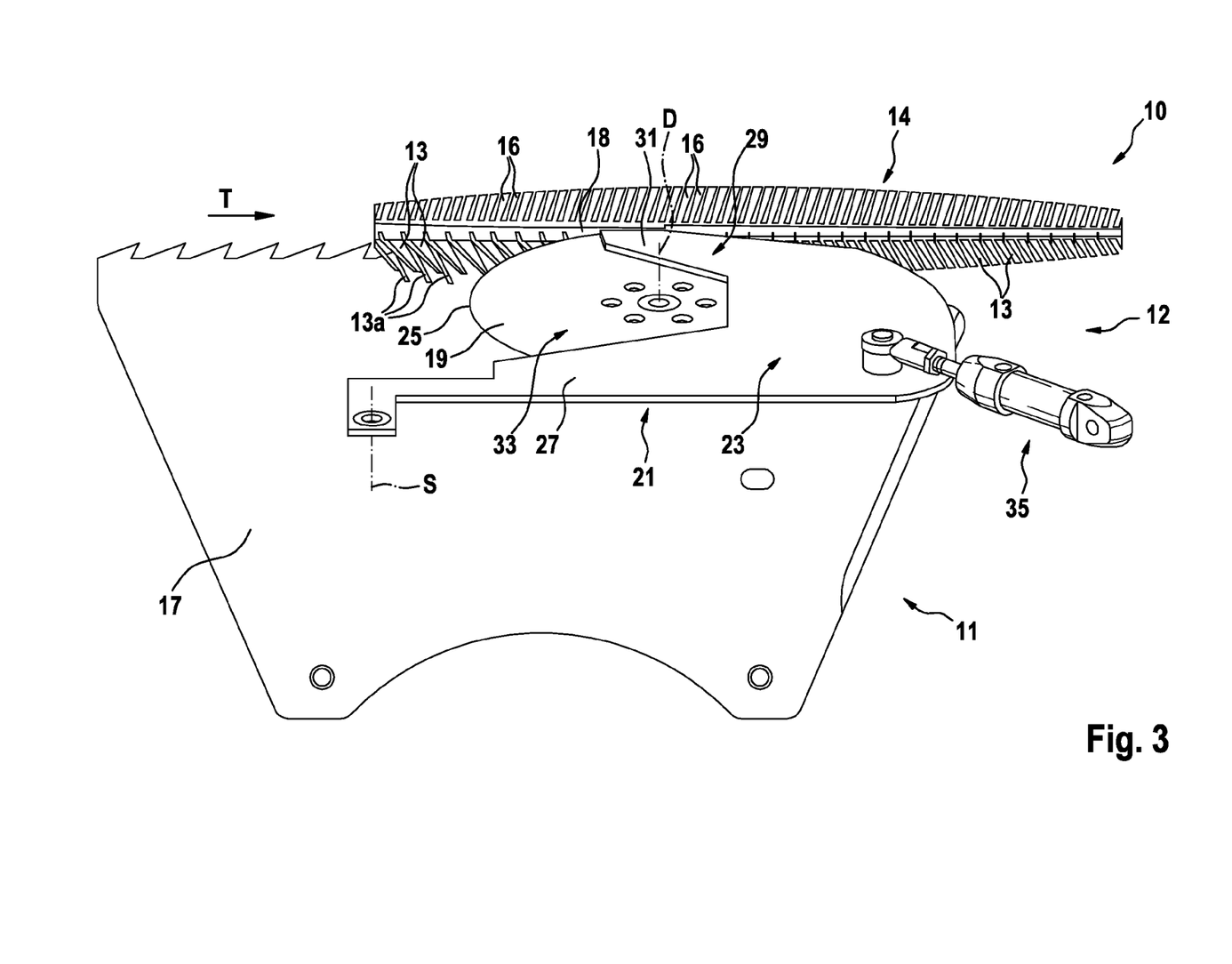
Figure 4:
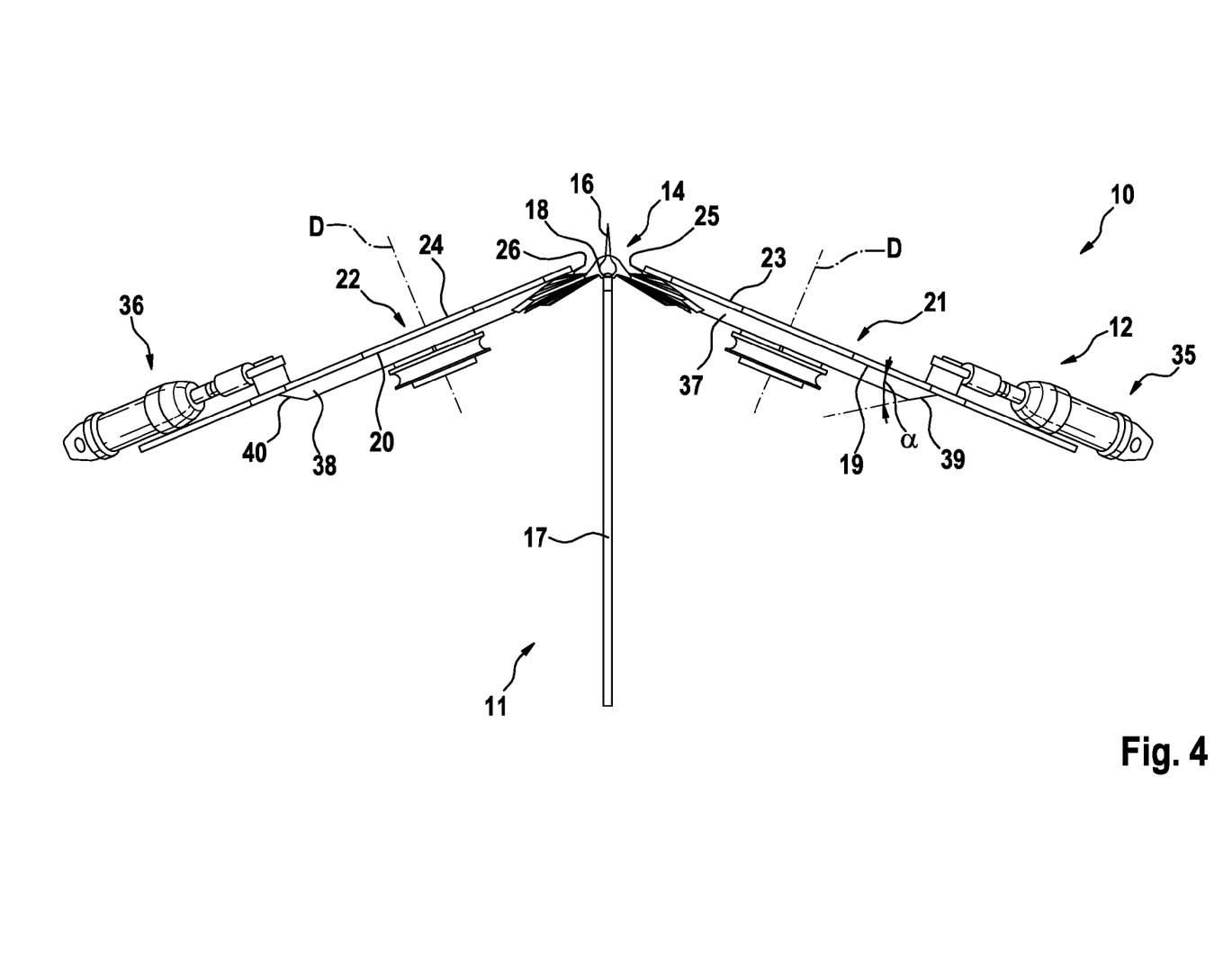
Figure 5:
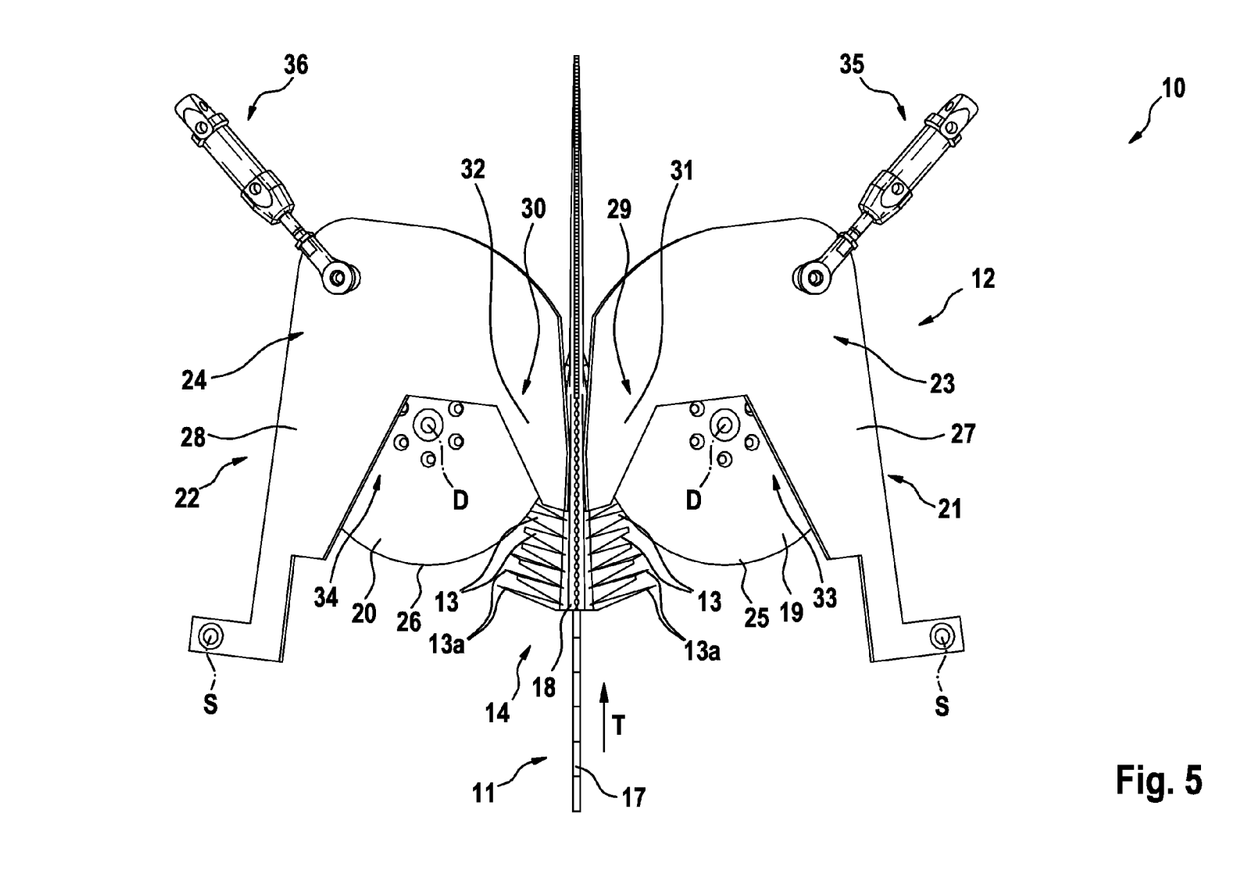
Figure 6:
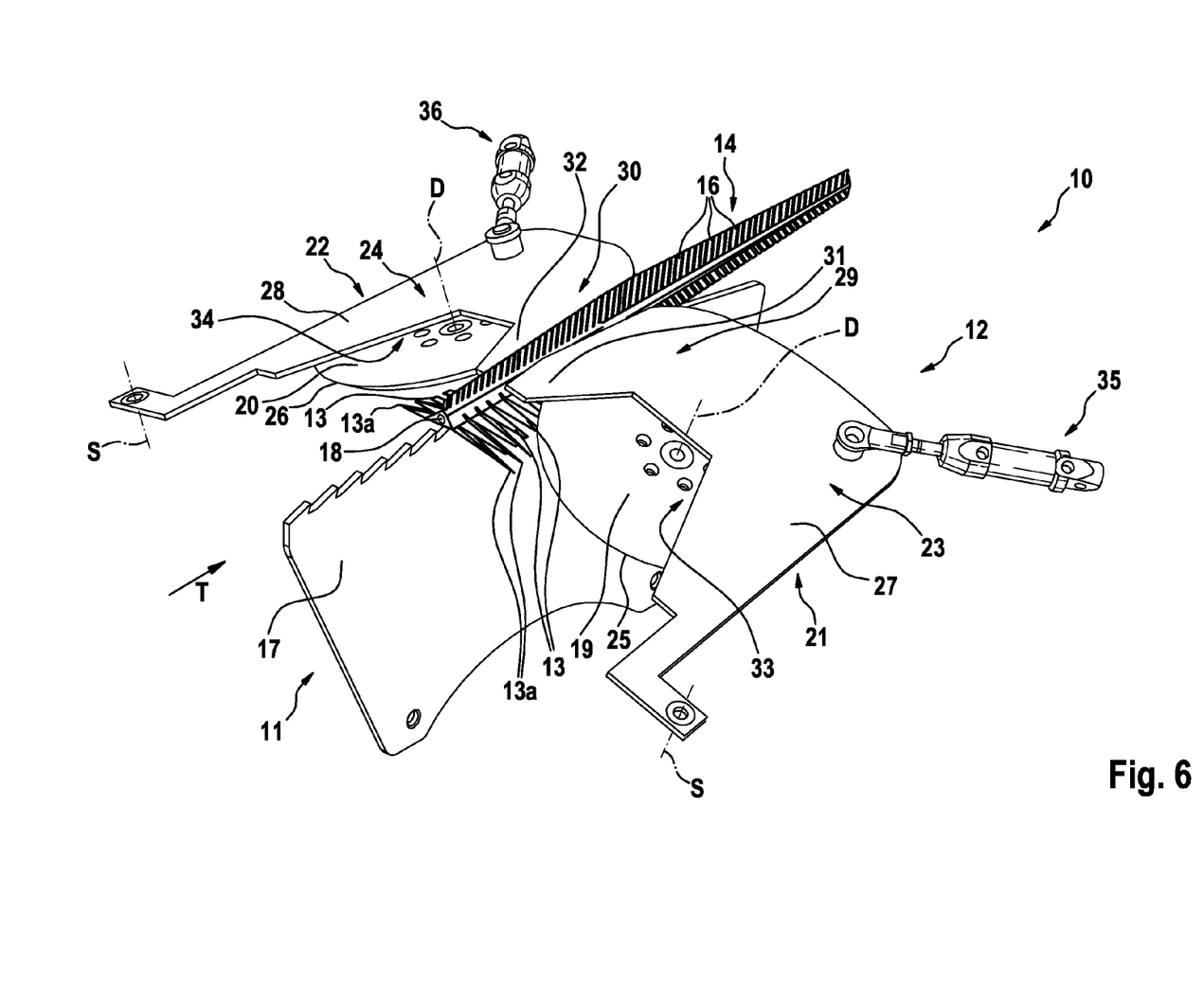
Figure 7:
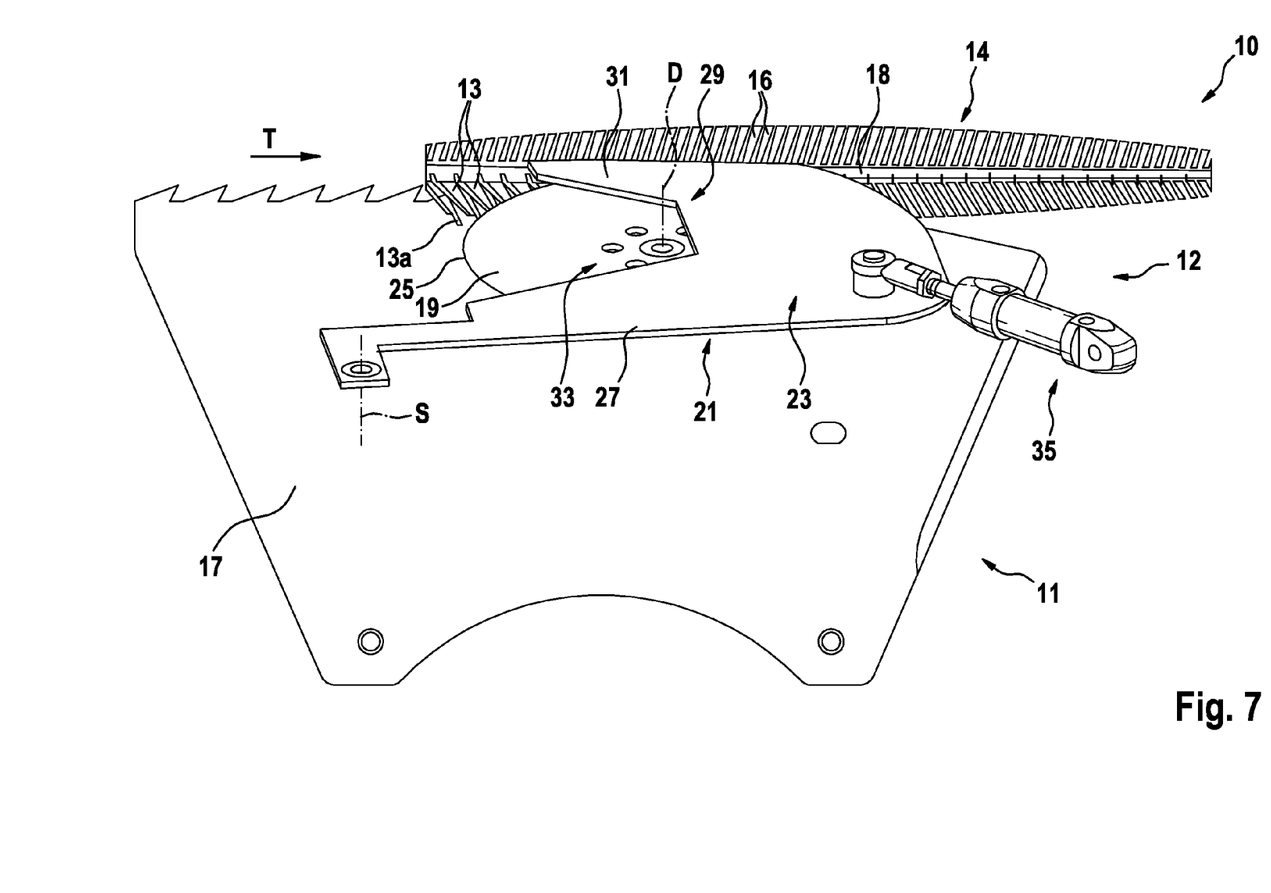
Figure 8:
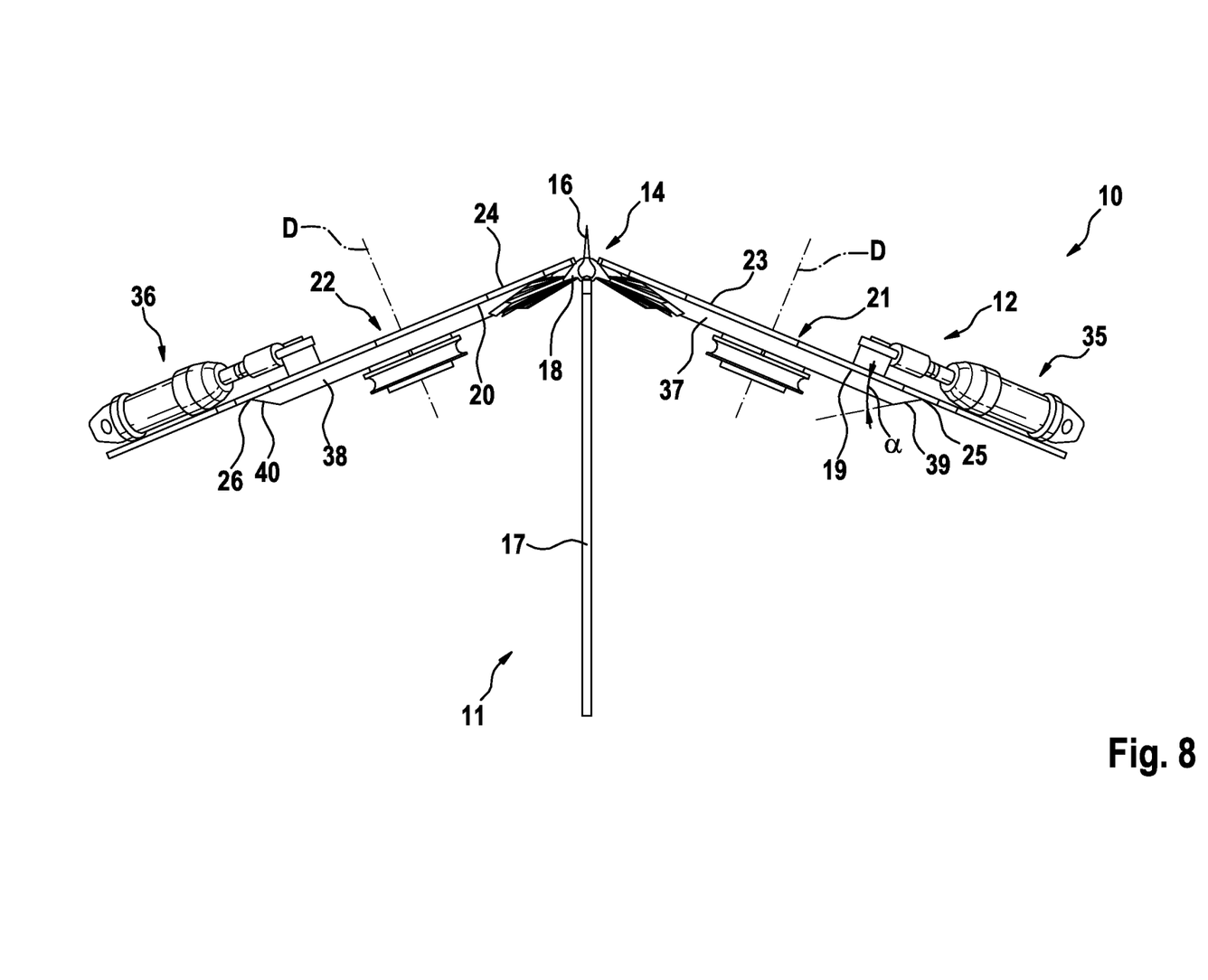
Figure 9:
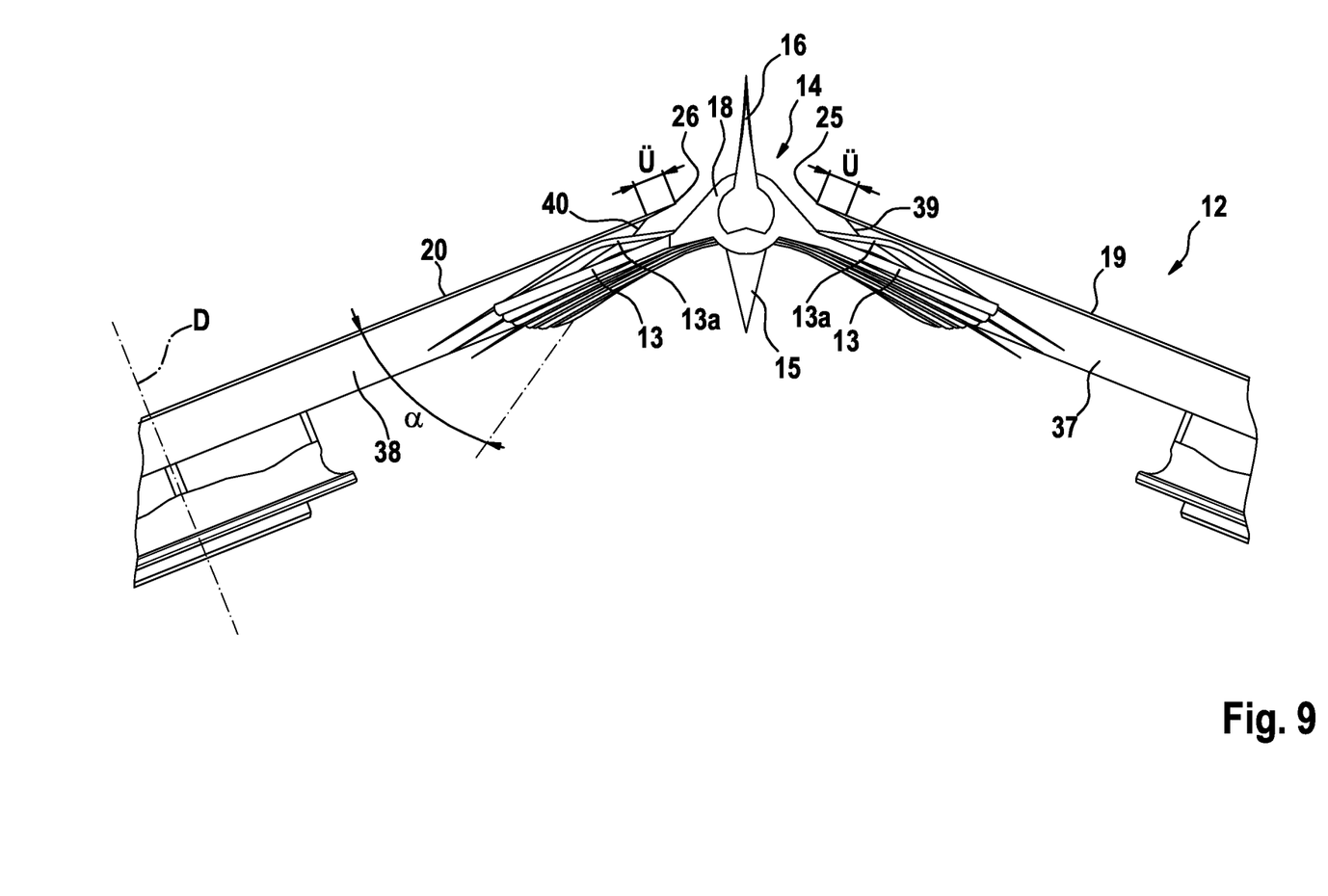

The means 21, 22 is preferably designed and adapted for actively holding down flank bones 13a arranged in the head region of the fish and comprises a deflecting element 23, 24 which is arranged on the upper side of the circular knife 19, 20 directed away from the flank bones 13, 13a and is designed and adapted to be movable out of a waiting position (see e.g. FIG. 1), which uncovers the cutting edge 25, 26 of the circular knife 19, 20, into a deflecting position (see e.g. FIG. 5), which at least partially covers the cutting edge 25, 26 of the circular knife 19, 20 and the cutting edge 25, 26 which runs in front counter to the transport direction T, and back again. The means 21, 22 is referred to as active as it is movable itself and separately for holding down the flank bones 13, 13a and is movable towards and away from them. The deflecting element 23, 24 partially covers the circular knives 19, 20 and is designed to be disc-like. The outer edges of the deflecting element 23, 24 are designed to be blunt. Each deflecting element 23, 24 comprises a basic body 27, 28 and a deflecting body 29, 30 designed integrally with the basic body 27, 28. The deflecting elements 23, 24 are preferably designed integrally. However, a multi-part design of the deflecting elements 23, 24 is also possible. The deflecting body 29, 30 is formed from a finger-like ledge 31, 32 exposed in relation to the basic body 27, 28 which is aligned counter to the transport direction T. In other words, the deflecting element 23, 24 has a basic shape deviating from a circular shape with, for example, a V-shaped or U-shaped recess 33, 34. The recess 33, 34 may also have a different shape. The deciding factor for shaping of the deflecting element 23, 24 lying parallel to the circular knife 19, 20 is the provision of the protruding section which runs in front counter to the transport direction T, namely provision of the finger-like ledge 31, 32 which is preferably movable via the basic body 28, 29 such that the section reaches the flank bones 13a before the circular knife 19, 20 or its cutting edge 25, 26 engages in the flesh or in said flank bones 13a.

As both the circular knife 19, 20 and also the deflecting element 23, 24 are designed to be disc-like, the components referred to each span one plane. These planes of circular knife 19, 20 and deflecting element 23, 24 lie preferably parallel to one another for each pairing of circular knife 19/deflecting element 23 and circular knife 20/deflecting element 24 respectively. The deflecting element 23, 24 is movable in relation to the circular knife 19, 20, and that is in such a manner that the pivot plane, that is the plane in which the deflecting element 23, 24 is moved, also lies parallel to the plane of circular knife 19, 20 and deflecting element 23, 24. The deflecting element 23, 24 is pivotable for this purpose about a pivot point S, the pivot point S lying outside the point of rotation D of the circular knives 19, 20. The pivot point S or the pivot axis lying perpendicular to the pivot plane also lies preferably outside the circular knives 19, 20 such that a pivot lever arm is formed which is larger or longer than the radius of the circular knives 19, 20. For initiation of the pivoting movement, which is preferably controlled in a timed manner, each deflecting element 23, 24 is assigned a pivoting mechanism. In the embodiment shown, the pivoting mechanism comprises a pneumatic cylinder unit 35, 36. This may, however, also be supplemented or replaced by other conventional operating mechanisms. Limiting means, not illustrated, for limiting the pivot path may also be provided as an option. In other embodiments, not illustrated, the circular knife 19, 20 and the deflecting element 23, 24 may optionally be at an angle to each other. The relative movement between circular knife 19, 20 and deflecting element 23, 24 may also be realised by a linear movement.

In a preferred development of the invention, the means 21, 22 is preferably designed and adapted for holding down flank bones 13a arranged in the head region of the fish and comprises a deflecting element 37, 38 which is arranged on the underside of the circular knife 19, 20 directed towards the flank bones 13, 13a. The cutting edge 25, 26 of the circular knife 19, 20 has a larger circumference than the deflecting element 37, 38 such that the circular knife 19, 20 projects with the cutting edge 25, 26 beyond the deflecting element 37, 38. This deflecting element 37, 38, which may be designed to be stationary or rotating with the circular knife 19, 20, is configured to be disc-like or plate-shaped and has a thickness which is preferably thicker or greater than the thickness of the circular knife 19, 20.

In a preferred embodiment, the deflecting element 37, 38 is an integral part of the circular knife 19, 20, as the circular knife 19, 20 and the deflecting elements 37, 38 are combined into an integral unit or are joined together. This unit can be driven so as to rotate about the point of rotation D. The disc-like or plate-shaped deflecting element 37, 38 is arranged concentrically to the circular knife 19, 20. A ledge is formed due to the difference between the diameters of circular knife 19, 20 and deflecting element 37, 38, said ledge preferably being steplessly bridged by a peripheral, ramp-shaped transition 39, 40. This transition 39, 40 is designed to be ramp-shaped for forming a deflection angle $\alpha$. In other words, the transition 39, 40 increases radially inwards starting from the cutting edge 25, 26, it being possible for the starting point of the transition 39, 40 to be set back in relation to the outer circumference of the cutting edge 25, 26 to form an overhang Ü of the circular knife 19, 20 beyond the deflecting element 37, 38. The size of the angle $\alpha$ is variable and depends on the species of fish to be processed or the anatomy of its bone structure 14. Depending on pre-selection it is between 15° and 75° and preferably between 30° and 60°. The size of the overhang Ü of the cutting edge 25, 26 in relation to the deflecting element 37, 38 is small compared to the diameter of the circular knife 19, 20 and the deflecting element 37, 38 and is preferably just a few mm. However, the size of the overhang Ü can also be selected differently at will.

In the following, the principle of the method according to the invention will be described based on the preferred embodiment, in which the means 21, 22 comprise the deflecting elements 23, 24 and also the deflecting elements 37, 38.

The fish are preferably placed manually on the supporting body 17, that is tail-first in transport direction T and belly-down such that the fish rests with its backbone 18 on the supporting body 17. Aligned in this way, the decapitated and substantially gutted fish, in which the ventral spokes 15 and dorsal spokes 16 are already cut free, is transported in transport direction T along a transport path by conveying means 11. On passing the cutting device 12, which lies on the transport path, the flesh is removed from the flank bones 13, 13a of the bone structure 14 of the fish by the cutting device 12, by inserting into the fish, on either side of the fish between the flank bones (13, 13a) and the flesh to be removed, one rotating circular knife (19, 20) of the cutting device (14) in each case above the flank bones (13, 13a) up to the backbone (18) of the bone structure (14). As a result, the two fillets are cut free from the flank bones 13, 13a.

To prevent flank bones 13, 13a, namely in particular such flank bones 13a which due to their curvature lie in the cutting region of the circular knives 19, 20, from being cut up, according to the invention at least some of the flank bones 13a are pressed downwards by a means 21, 22 for holding down the flank bones 13a during the process of removing the flesh from the bone structure 14. The flank bones 13a are pushed so far downwards that they are guided under the rotating cutting edge 25, 26 of the circular knives 19, 20.

Holding down or pressing down of the flank bones 13a in the head region arching upwards into the cutting region of the circular knives 19, 20 can take place in different ways. A combination of loading the flank bones 13a concerned with a hold-down or deflecting force from above the circular knife 19, 20 and from underneath the circular knife 19, 20 is preferred. When the fish lying on the supporting body 17 enters, the deflecting element 23, 24 arranged above the circular knives 19, 20 is located in a waiting position (see in particular FIGS. 1 to 4 for this). In this waiting position, the cutting edge 25, 26 of the circular knife 19, 20 is exposed on the side directed towards the bone structure 14 and removes the flesh from the flank bones 13 which are located in the tail region. As the fish passes further along the transport path—shortly before the fish reaches the region of the cutting device 12 with its flank bones 13, 13*a* in the head region—the deflecting element 23, 24 is pivoted about the pivot axis S in such a way that the deflecting element 23, 24 on the one hand covers the cutting edge 25, 26 on the side directed towards the bone structure 14 and on the other hand "travels" with its finger-like ledge 31, 32 along the flank bones 13, 13*a* counter to the transport direction T. Since the ledge 31, 32 projects beyond the cutting edge 25, 26 counter to the transport direction T in the deflecting position (see in particular FIGS. 5 to 8), the upright flank bones 13*a* first hit the ledge 31, 32 which forces the flank bones 13*a* downwards so that they are guided under the cutting edge 25, 26 before it can cut up the flank bones 13*a*. Once the flank bones 13*a* are underneath the cutting edge 25, 26, said flank bones 13*a* are continuously held under the cutting edge 25, 26 outside the cutting region of the circular knives 19, 20. This holding down is thus effected by a hold-down or deflecting force from above the circular knives 19, 20. As a result of the ledge 31, 32 moving counter to the transport direction T into the fish, it is additionally possible to achieve the effect that the ledge 31, 32 removes the flesh from the bone structure 14 and in particular from the flank bones 13, 13*a* with the fixed and blunt edge as in some fish species, such as cod for example, in this region there is no firm connection between the flesh and the flank bones 13, 13*a* because in this region the flesh and the flank bones 13, 13*a* are separated from each other by a membrane-like layer.

In addition, holding down is effected by a hold-down or deflecting force from underneath the circular knives 19, 20 as the flank bones 13*a* curving upwards into the cutting region of the circular knives 19, 20 are pressed down by the deflecting element 37, 38 before the flank bones 13*a* can hit the cutting edge 25, 26. Due to the deflecting elements 37, 38 which, starting from the circular knife 19, 20, project downwards, a sort of "clearing" of the cutting region takes place as the protruding flank bones 13*a* are inevitably deflected downwards.

The method, however, can be performed similarly with only one of the two deflecting elements 23, 24 or 37, 38. The previously described apparatus 10 according to the invention is particularly suitable for carrying out the method.

The active deflecting elements 23, 24 are controlled or pivoted about the pivot point S in a timed manner, that is between the waiting position and the deflecting position. Only when approximately two thirds of the bone structure 14 has passed the circular knives 19, 20, are the deflecting elements 23, 24 pivoted out of the waiting position into the deflecting position. To find the optimum time for pivoting into the deflecting position, the controller of the deflecting elements 23, 24 may be connected to a higher level control system which can communicate information, e.g. on the size of the fish, the transport speed and other parameters influencing the removal process.

The invention claimed is:

1. Apparatus, designed and adapted for machine processing of decapitated and at least substantially gutted fish, transported tail-first in transport direction T on a transport path, comprising a conveying means which conveys the fish along the transport path and a cutting device for removing the flesh from the flank bones of the bone structure of a fish after cutting free the ventral and dorsal spokes, wherein the cutting device comprises a pair of circular knives which can be driven so as to rotate about a point of rotation D and which are arranged on opposite sides of the transport path and are designed to be adjustable relative to the position of the fish and thus to the bone structure, characterised in that each circular knife is allocated a means that is designed and adapted to hold down at least some of the flank bones during the removal process of the flesh from the bone structure.

2. Apparatus according to claim 1, characterised in that the means is designed and adapted for actively holding down flank bones arranged in the head region of the fish and comprises a deflecting element which is arranged on the upper side of the circular knife directed away from the flank bones and is designed and adapted to be movable out of a waiting position, which uncovers the cutting edge of the circular knife, into a deflecting position, which at least partially covers the cutting edge of the circular knife and the cutting edge which runs in front counter to the transport direction T, and back again.

3. Apparatus according to claim 2, characterised in that the deflecting element is disc-like and comprises a basic body and a deflecting body designed integrally with said basic body, wherein the deflecting body is formed from a finger-like ledge exposed in relation to the basic body which is aligned counter to the transport direction T.

4. Apparatus according to claim 2, characterised in that the planes defined by the deflecting element and the circular knife lie parallel to each other and the deflecting element is movable relative to the circular knife.

5. Apparatus according to claim 2, characterised in that the deflecting element is pivotable about a pivot point S which lies outside the point of rotation D of the circular knife.

6. Apparatus according to claim 2, characterised in that a pneumatic cylinder unit is assigned to the deflecting element for executing the pivoting movement about the pivot point S.

7. Apparatus according to claim 1, characterised in that the means is designed and adapted for holding down flank bones arranged in the head region of the fish and comprises a deflecting element which is arranged on the underside of the circular knife directed towards the flank bones, wherein the cutting edge of the circular knife has a larger circumference that the deflecting element such that the circular knife projects with the cutting edge beyond the deflecting element.

8. Apparatus according to claim 7, characterised in that the deflecting element has a greater thickness than the circular knife.

9. Apparatus according to claim 7, characterised in that the deflecting element is an integral part of the circular knife, such that the deflecting element can be driven together with the circular knife so as to rotate about a point of rotation D.

10. Apparatus according to claim 7, characterised in that the deflecting element is designed in the shape of a plate and is arranged concentrically to the circular knife, wherein a peripheral, ramp-shaped transition is configured between the circular knife and the deflecting element to form a deflection angle $\alpha$.

11. A method for machine processing of decapitated and at least substantially gutted fish in which the ventral spokes and dorsal spokes are already cut free, comprising the steps:

Transporting the fish tail-first in transport direction T along a transport path by a conveying means, and Removing the flesh from the flank bones of the bone structure of the fish by means of a cutting device, by inserting into the fish, on either side of the fish between the flank bones and the flesh to be removed, one rotating circular knife of the cutting device in each case above the flank bones up to the backbone of the bone structure, characterised in that during the process of removing the flesh from the bone structure at least some of the flank bones are pressed downwards by a means for holding down the flank bones.

12. The method according to claim 11, characterised in that flank bones arranged in the head region of the fish are actively guided downwards under the cutting edge of the circular knife by the means for holding down, as a deflecting element arranged on the upper side of the circular knife directed away from the flank bones is moved out of a waiting position which uncovers the cutting edge of the circular knife, into a deflecting position which at least partially covers the cutting edge of the circular knife and the cutting edge which runs in front counter to the transport direction T, and back again.

13. The method according to claim 11, characterised in that the deflecting element is pivoted in a timed manner about a pivot point S which lies outside the point of rotation D of the circular knife.

14. The method according to claim 11, characterised in that flank bones arranged in the head region of the fish are guided downwards under the cutting edge by the means for holding down, as these flank bones are deflected downwards, due to the transport along the transport path, by a deflecting element arranged on the underside of the circular knife directed towards the flank bones.

* * * * *

UNITED STATES PATENT AND TRADEMARK OFFICE
CERTIFICATE OF CORRECTION

PATENT NO. : 9,532,582 B2
APPLICATION NO. : 14/784576
DATED : January 3, 2017
INVENTOR(S) : Michael Jürs, Matthias Schroeder and Manfred Brandt It is certified that error appears in the above-identified patent and that said Letters Patent is hereby corrected as shown below:

On the Title Page

In Item (57), the Abstract:
"The invention relates to an apparatus, designed and adapted for machine processing of decapitated and at least substantially gutted fish, transported tail-first in transport direction T on a transport path, comprising a conveying means which conveys the fish along the transport path and a cutting device for removing the flesh from the flank bones of the bone structure of a fish after cutting free the ventral and dorsal spokes, wherein the cutting device comprises a pair of circular knives which can be driven so as to rotate about a point of rotation D and which are arranged on opposite sides of the transport path and are designed to be adjustable relative to the position of the fish and thus to the bone structure, which is characterised in that each circular knife is allocated a means that is designed and configured to hold down at least some of the flank bones during the removal process of the flesh from the bone structure. Furthermore, the invention relates to a corresponding method."

Should read as follows:
"The invention relates to an apparatus for machine processing of decapitated and at least substantially gutted fish, transported tail-first in transport direction T on a transport path. The apparatus includes a conveyor that conveys the fish along the transport path and a cutting device for removing the flesh from the flank bones of the bone structure of a fish after cutting free the ventral and dorsal spokes. The cutting device includes a pair of circular knives which can be driven to rotate about a point of rotation D and which are arranged on opposite sides of the transport path and are designed to be adjustable relative to the position of the fish and thus to the bone structure, in that each circular knife is designed and configured to hold down at least some of the flank bones during the removal process of the flesh from the bone structure."

Signed and Sealed this
Sixteenth Day of May, 2017

Michelle K. Lee
*Director of the United States Patent and Trademark Office*